United States Patent [19]
O'Boyle

[11] Patent Number: 5,856,914
[45] Date of Patent: *Jan. 5, 1999

[54] MICRO-ELECTRONIC ASSEMBLY INCLUDING A FLIP-CHIP MOUNTED MICRO-DEVICE AND METHOD

[75] Inventor: John O'Boyle, Redwood City, Calif.

[73] Assignee: National Semiconductor Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 688,634

[22] Filed: Jul. 29, 1996

[51] Int. Cl.⁶ ..................................................... H05K 1/18
[52] U.S. Cl. ........................................... 361/761; 361/764
[58] Field of Search .............................. 73/493; 174/260, 174/261; 257/700, 723, 724, 697, 778; 333/246, 247; 361/761–764, 782, 783, 748; 439/68, 83; 84/24 D; 33/1 PT, 1 V, 709, 712, 713, 714, 716

[56] References Cited

U.S. PATENT DOCUMENTS

| | | | |
|---|---|---|---|
| 4,285,002 | 8/1981 | Campbell | 257/678 |
| 4,843,188 | 6/1989 | Patterson et al. | 174/52.4 |
| 4,906,957 | 3/1990 | Wilson | 333/246 |
| 5,072,331 | 12/1991 | Thiele et al. | 361/767 |
| 5,406,454 | 4/1995 | Dinger et al. | 361/748 |
| 5,591,959 | 1/1997 | Cigna et al. | 257/777 |
| 5,760,478 | 6/1998 | Bozso et al. | 257/778 |

FOREIGN PATENT DOCUMENTS

| | | | |
|---|---|---|---|
| 59-74653 | 4/1984 | Japan | 257/697 |
| 4-276689 | 10/1992 | Japan | 439/68 |
| 4-370957 | 12/1992 | Japan | 257/700 |

*Primary Examiner*—Donald Sparks
*Attorney, Agent, or Firm*—Beyer & Weaver LLP

[57] ABSTRACT

A micro-electronic assembly, a substrate for use in the assembly and an associated method are disclosed herein. The substrate includes an outer surface configuration defining an aperture within a first surface and electrically conductive leads on the first surface. In the overall micro-electronic assembly, a micro-device includes an active surface supporting at least one component which projects outwardly from the surface. The micro-device further includes electrically conductive bumps on the active surface. The micro-device is positioned on the first surface of the substrate such that the projecting component extends at least partially into the aperture defined by the substrate and so that the electrically conductive leads of the micro-device are electrically engaged with the electrically conductive leads of the substrate.

26 Claims, 2 Drawing Sheets

MICRO-ELECTRONIC ASSEMBLY INCLUDING A FLIP-CHIP MOUNTED MICRO-DEVICE AND METHOD

BACKGROUND OF THE INVENTION

The present invention relates generally to the field of surface mounting a micro-device and similar such devices and more particularly to surface mounting a micro-device including a package outline which interferes with conventional "flip-chip" surface mounting techniques.

In the field of integrated circuit packaging, surface mount components have become increasingly popular at least in part due to the relatively small footprint which these parts occupy in an overall electronic assembly. Therefore, the use of surface mount components has significantly advanced the continuing goal of miniaturization of electronic assemblies.

One particularly advantageous form used in surface mounting is the "flip-chip" configuration. In this configuration, an integrated circuit chip or die includes a series of bonding pads on an upper surface of the die. Conductive bumps are formed on the bonding pads for supporting and electrically interfacing the die to a separate support member. The die is then inverted and placed on the support member such as, for example, a substrate which includes a pattern of electrically conductive leads arranged for contacting respective ones of the bumps. Once the bumps are in contact with the leads, the material from which the bumps are comprised is caused to flow whereby to form a permanent bond with the substrate. In this way, the die is supported above and does not directly contact the substrate. The semiconductor die used in this configuration is generally of a planar geometry. That is, the upper surface of the die which receives the conductive bumps is generally flat and, in any case, typically resides above and spaced from the confronting support member.

More recently, designers have developed components in the form of micro-devices which do not include the planar geometry of a semiconductor die. One example of such a micro-device is a micro-machined condenser microphone. This microphone includes a bridge structure which forms one immovable "plate" of the condenser (capacitor) while a thin silicon diaphragm forms a movable "plate". The bridge structure is positioned on and extends outwardly a substantial distance from the same surface on which the bonding pads of the microphone are positioned. Surface mounting of this microphone and similar such micro-devices in a flip-chip configuration is difficult to accomplish since the bridge structure interferes with the conventional flip-chip mounting technique described above. However, the present invention provides an assembly, a substrate configured for use in the assembly and an associated method for surface mounting of such micro-devices in a highly advantageous flip-chip configuration.

SUMMARY OF THE INVENTION

As will be described in more detail hereinafter, there is disclosed herein a micro-electronic assembly, a substrate for use in the assembly and an associated method. The substrate includes an outer surface configuration defining an aperture within a first surface thereof and electrically conductive means on the first surface. In the overall micro-electronic assembly, there is included a micro-device which itself includes an active surface supporting at least one component which projects outwardly from the surface. The micro-device further includes electrical connecting means positioned on the active surface. The micro-device is positioned on the first surface of the substrate such that the projecting component extends at least partially into the aperture defined by the substrate and so that the electrical connecting means of the micro-device is electrically engaged with the electrically conductive means of the substrate.

BRIEF DESCRIPTION OF THE DRAWINGS

The present invention may be understood by reference to the following detailed description taken in conjunction with the drawings, in which.

DETAILED DESCRIPTION OF THE INVENTION

Figure 1:
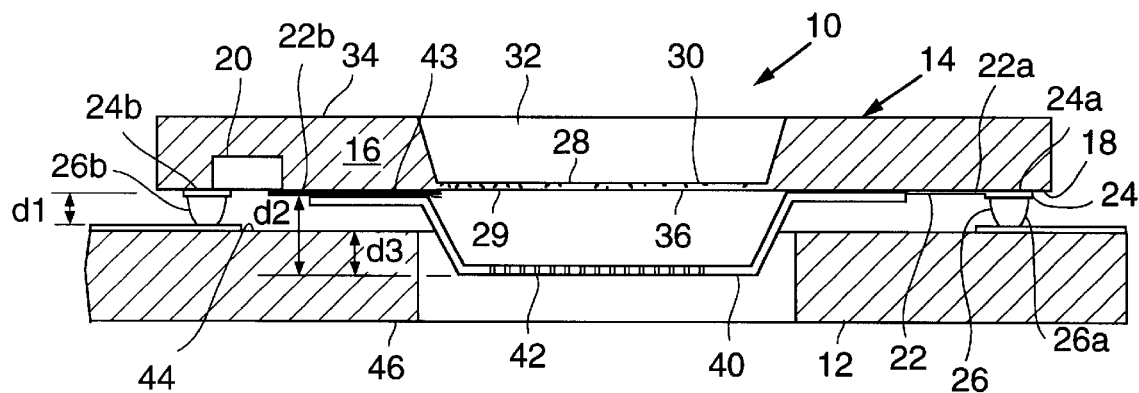
FIG. 1 is a diagrammatic cross-sectional view, in elevation, generally illustrating one embodiment of a micro-electronic assembly including a substrate manufactured in accordance with the present invention.

Attention is immediately directed to FIG. I which illustrates a micro-electronic assembly manufactured in accordance with a method of the present invention and generally indicated by reference numeral 10. Assembly 10 includes a substrate 12 which supports a micro-machined condenser microphone which is generally indicated by reference number 14. Microphone 14 is illustrative of a variety of micro-devices which, in addition to microphones, may include other types of devices and/or sub-assemblies such as, for example, pressure sensors and accelerometers. It should be noted that, when certain features of assembly 10 are described in the specification and the claims, these features are described with respect to the orientation shown in FIG. 1. However, this orientation is used for purposes of simplicity and descriptive terminology used with respect thereto is not intended to be limiting since assembly 10 is operational irrespective of any particular orientation. Details of microphone 14 and the remainder of micro-electronic assembly 10 will be described hereinafter.

Figure 2:
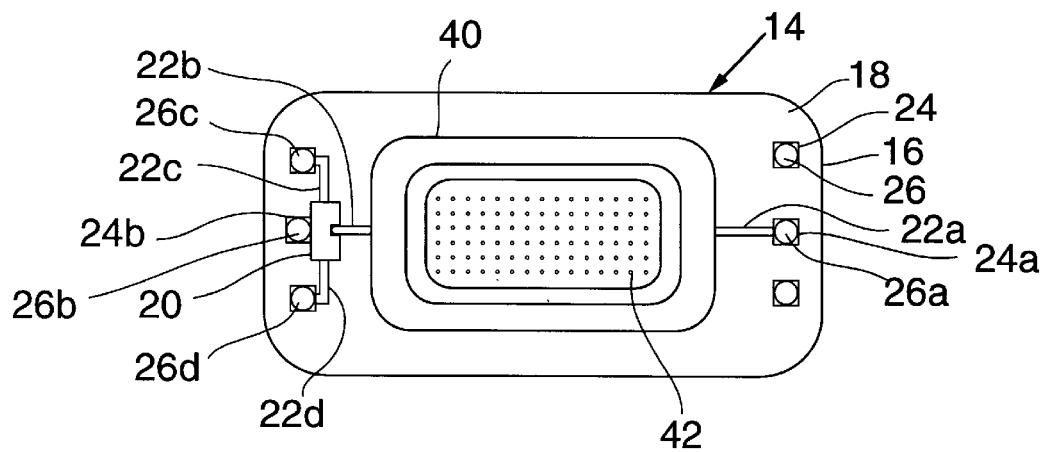
FIG. 2 is a diagrammatic plan view generally illustrating one surface of a micro-device which forms part of the micro-electronic assembly illustrated in FIG. 1.

Referring to FIG. 2 in conjunction with FIG. 1, microphone 14 includes a die 16 having an active surface 18. Die 16 is typically comprised of semiconductor material such as, for example, crystalline silicon. Integrated circuitry 20 may be formed in die 16 adjacent active surface 18 in a manner which is well known in the art and which may include active and/or passive components. Alternatively, the integrated circuitry may be formed in a separate, active die (not shown) which is supported by the substrate adjacent to microphone 14. In the case where active components are included, an audio signal derived from the diaphragm may be amplified or processed in a predetermined way by integrated circuitry 20. Active surface 18 supports an arrangement of electrically conductive traces 22. The latter are terminated using a plurality of bonding pads 24. A plurality of electrically conductive bumps 26 are formed on bonding pads 24. Bumps 26 include a predetermined height d1 and are typically formed using gold or other such materials which are flowable and capable of forming a bond with bonding pads 24 and with appropriate components of substrate 12, as will be described at an appropriate point below.

Continuing to refer to FIGS. 1 and 2, die 16 defines a thin, flexible silicon diaphragm 28 which is made to be electrically conductive by appropriate doping throughout with atoms of, for example, boron 29. One surface 30 of diaphragm 28 forms the floor of an aperture 32. The latter may be formed, for example, by chemical machining downward from a surface 34 of die 16 which opposes active surface 18. Diaphragm 28 includes an opposing surface 36 which forms a portion of active surface 18 and which is coplanar with the latter. A bridge structure 40 is supported on active surface 18 and extends outwardly therefrom by a distance d2 so as to form a capacitor with diaphragm 28 wherein the latter comprises the movable plate of the condenser microphone. Bridge structure 40 is typically formed by electroplating using electrically conductive material such as, for example, gold. A plurality of perforations 42 are formed in the bridge structure immediately opposing diaphragm 28 such that acoustic energy may readily pass through the perforations whereby to impinge upon the diaphragm or to allow the release of acoustic energy transmitted from the opposite side of the diaphragm. Bridge structure 40 is electrically connected with one end of electrically conductive trace 22a while electrically conductive diaphragm 28 is electrically connected with one end of electrically conductive trace 22b. The other end of trace 22a is connected with bump 26a while the other end of trace 22b may be connected with integrated circuitry 20. Trace 22a may be grounded via conductive bump 26a in order to ground bridge structure 40 and to provide a ground potential for circuitry 20. Conductive bump 26b may be electrically connected with circuitry 20 via bonding pad 24b. Trace 22b is isolated from bridge structure 40 by an insulative layer 43. Therefore, the output of the microphone is available by electrical connection between conductive bumps 26b and 26a. Traces 22c and 22d may be utilized for providing biasing voltages to active components of integrated circuitry 20. It is to be understood that microphone 14 is exemplary of only one embodiment of an entire class of micro-devices, as described above, which are useful within the framework of the teachings of the present invention.

Figure 3:
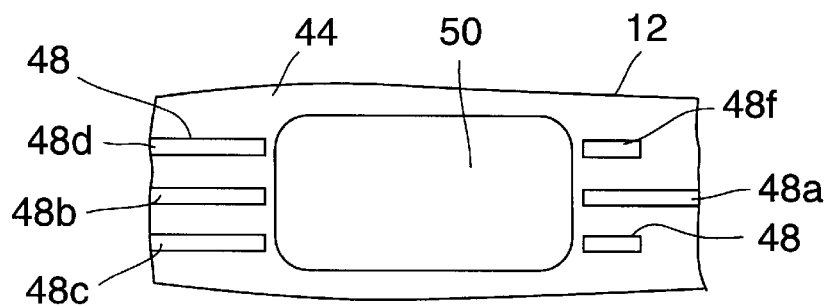
FIG. 3 is a diagrammatic fragmentary plan view generally illustrating a substrate manufactured in accordance with the present invention and which forms part of the micro-electronic assembly illustrated in FIG. 1.

Turning to FIG. 3 in conjunction with FIGS. 1 and 2, substrate 12 includes a first surface 44 and a second surface 46. First surface 44 supports a plurality of electrically conductive leads 48a–f such that one end of each lead is adjacent an aperture 50 formed, in the present example, as a through-hole from first surface 44 to second surface 46. The other ends (not shown) of leads 48 electrically interface either with other components (not shown) which are also supported by substrate 12 or may provide for external electrical connection of overall micro-electronic assembly 10. In the present example, lead 48a is grounded while lead 48b carries the microphone output signal from conductive bump 26b and associated trace 22b. Leads 48c and 48d are in electrical contact with conductive bumps 26c and 26d, respectively, for providing appropriate bias voltages to integrated circuitry 20, if included. As seen in FIG. 3, leads 48e and 48f extend only a short distance from aperture 50 and are simply used in forming a bond with conductive bumps 26e and 26f, respectively, whereby additional support is provided for microphone 14. Any number of leads and cooperating conductive bumps may be utilized in this manner for enhancing support of a micro-device in view of a particular application. Substrate 12 may be formed from an unlimited variety of materials including those which are currently well known in the art such as, for example, alumina or other such ceramic material. Leads 48, for example, may comprise printed leads formed in a manner which is well known in the art. However, any form of printed lead or bonding pad is suitable for use on surface 44 of the substrate provided only that electrical connection with conductive bumps 26 is facilitated.

Referring solely to FIG. 1 and in accordance with the present invention, microphone 14 is supported on substrate 12 in a highly advantageous way which has not been seen heretofore wherein the microphone, including projecting bridge structure 40, is supported in a surface mount flip-chip configuration with its active surface 18 confronting the substrate. Support of the microphone is achieved by conductive bumps 26 being in direct physical as well as electrical contact with electrically conductive leads 48 on the substrate. An electrically conductive bond is formed between respective bumps and ones of leads 48 in a well known manner by causing the material from which the bumps are formed to partially flow. In the depicted orientation, bridge structure 40 projects downwardly from the active surface of die 14 by approximately distance d2. Because conductive bumps 26 project downwardly from active surface 18 by approximately distance d1, bridge structure 40 extends into aperture 46 by a distance of approximately d3 which is equal to d2 minus d1. Such a projecting structure has not previously been accommodated in a flip-chip configuration. In the embodiment of FIG. 1, bridge structure 40 may actually project completely through aperture 46 of substrate 12 (not shown) with no physical contact whatsoever between the substrate and bridge structure. Moreover, conductive bumps 26 may be replaced with other forms of electrical interconnection such as, for example, conductive columns or other elongated conductive members. In accordance with the present invention and unlike the previously described traditional flip-chip configuration, the height of conductive bumps 26 (or whatever form of interconnections are used in their place), as regards preventing contact between projecting portions of micro-device 14 and substrate 12, is not particularly critical since cooperating aperture 50 may readily be formed in view of the height of the bumps. In fact, the optimum height of the conductive bumps may be governed by other design considerations.

Figure 4:
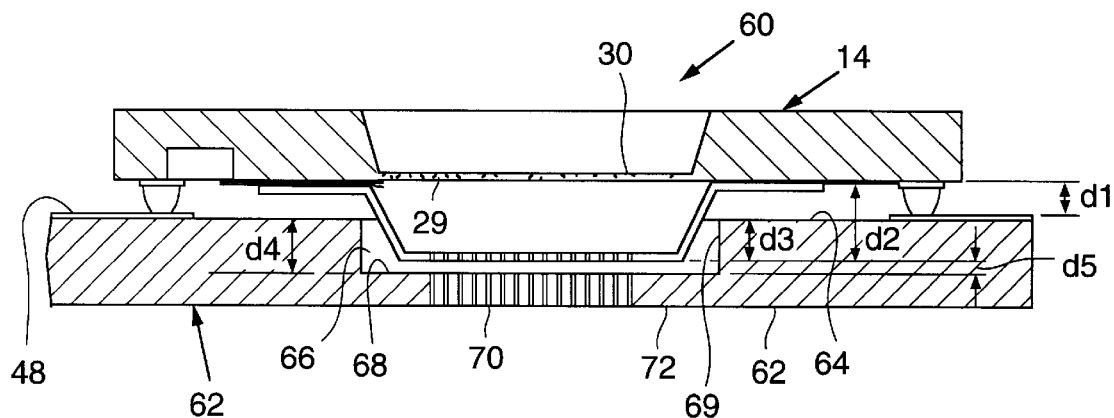
FIG. 4 is a diagrammatic cross-sectional view, in elevation, generally illustrating another embodiment of a micro-electronic assembly manufactured in accordance with the present invention.

Referring now to FIG. 4, another embodiment of a micro-electronic assembly manufactured in accordance with the method of the present invention is generally illustrated by reference number 60. Assembly 60 includes micromachined condenser microphone 14 which was previously described in detail in the discussion relating to FIGS. 1 through 3. Therefore, these descriptions will not be repeated for purposes of brevity. Assembly 60 further includes a substrate 62 which supports previously described electrically conductive leads 48 on a first surface 64. However, unlike substrate 12 of FIG. 1, substrate 62 defines an aperture 66 which includes a floor 68 at a distance d4 below first surface 64 and a side wall 69. A series of through-holes 70 extend from aperture floor 68 to an opposing surface 72 of substrate 62 such that sound energy may impinge upon diaphragm 28 via through-holes 70. The configuration of substrate 62 affords considerable protection to bridge structure 40, as compared with the embodiment of FIG. 1, for example, in an environment where an unprotected bridge structure could possibly sustain an impact. Once again, bridge structure 40 extends downwardly into aperture 66 by approximately distance d3. Therefore, aperture depth d4 must be greater than d3 so that bridge structure 40 remains a distance d5 above aperture floor 68 wherein d5 is equal to d4 minus d3. In accordance with the present invention, bridge structure 40 does not contact the substrate at any point including aperture floor 68 or side wall 69. It should be understood that aperture 66 may be configured in an unlimited number of ways in accordance with the present invention. For example, side wall 69 may be continuously or discontinuously sloped and aperture floor 68 need not be planar, but may include any suitable profile (not shown) which may be determined by the geometry of the micro-device to be supported.

Figure 5:
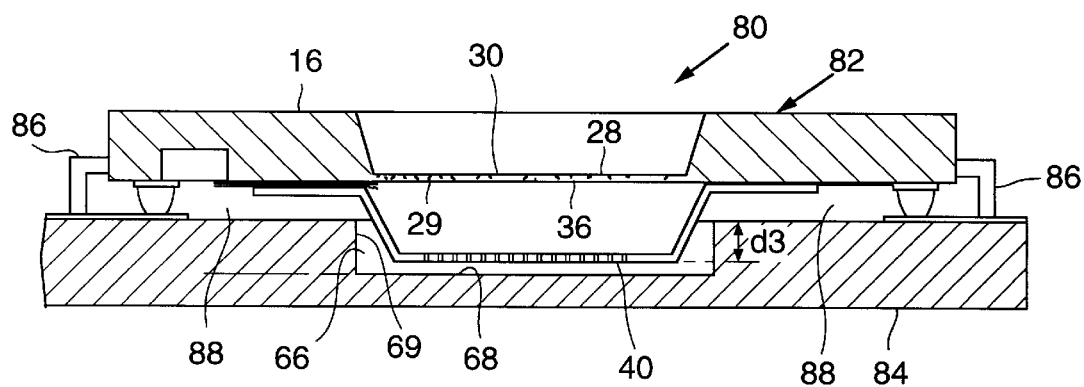
FIG. 5 is a diagrammatic cross-sectional view, in elevation, generally illustrating still another embodiment of a micro-electronic assembly manufactured in accordance with the present invention.

Turning to FIG. 5, still another embodiment of a micro-electronic assembly manufactured in accordance with the present invention is generally illustrated by reference number 80. Assembly 80 includes a pressure transducer 82 supported on a substrate 84. Pressure transducer 82 is essentially identical with previously described condenser microphone 14. Substrate 84 is essentially identical with previously described substrate 62 of FIG. 4 except that through-holes 70 need not be formed in the substrate material adjacent bridge structure 40. A peripheral sealing ring 86 is positioned around transducer 82 in a way which forms a sealed cavity 88 so as to isolate surface 36 of the diaphragm from the ambient environmental pressure. Cavity 88 may be shaped, evacuated or pressurized, as required, for an intended application. Descriptions of other like components will not be repeated since the reader may readily refer to the discussion relating to FIGS. 1 through 4, if needed. In operation, changes in pressure in the ambient environment of assembly 80 cause diaphragm 28 to deflect in a well known manner wherein the capacitance between the diaphragm and bridge structure 40 may be used as indicative of such pressure changes. It is mentioned that assembly 80 measures an absolute pressure difference between the ambient environment and sealed cavity 88. Alternatively, sealing ring 86 may be omitted in order to perform gage pressure measurements. In accordance with the present invention, bridge structure 40 projects into aperture 66 by approximately distance d3 such that it does not contact the substrate at any point including aperture floor 68 or side wall 69.

It should be understood that a micro-electronic assembly incorporating the substrate of the present invention may be embodied in many other specific forms and produced by other methods without departing from the spirit or scope of the present invention. Therefore, the present examples are to be considered as illustrative and not restrictive, and the invention is not to be limited to the details given herein, but may be modified within the scope of the appended claims.

What is claimed is:

1. A micro-electronic assembly, comprising:
   a) a substrate including an outer surface configuration defining an aperture within a first surface thereof and electrically conductive means on said first surface; and
   b) a micro-device including a die and a transducer, the die including an active surface supporting a component which forms part of the overall transducer and projects outwardly from said active surface, said micro-device further including electrical connecting means positioned on said active surface, said micro-device being positioned on the first surface of said substrate such that only said component extends at least partially into the aperture, and so that said electrical connecting means is electrically engaged with said electrically conductive means.

2. A micro-electronic assembly in accordance with claim 1 wherein said substrate includes a second surface opposing said first surface and said aperture is defined as a through-hole extending from the first surface to the second surface.

3. A micro-electronic assembly in accordance with claim 1 wherein said substrate defines said aperture including a floor at a predetermined distance below said first surface.

4. A micro-electronic assembly in accordance with claim 3 wherein said substrate includes a second surface opposing said first surface and wherein said substrate further defines at least one through-hole extending from said floor in said aperture to said second surface.

5. A micro-electronic assembly in accordance with claim 4 wherein a plurality of said through-holes are formed between said floor and said second surface.

6. A micro-electronic assembly in accordance with claim 1 wherein said electrical connecting means includes a series of bonding pads arranged on said active surface and an electrically conductive bump positioned on each said bonding pad such that the electrically conductive bumps are in electrical contact with the electrical connecting means of the micro-device.

7. A micro-electronic assembly in accordance with claim 6 wherein said electrically conductive means of said substrate includes a plurality of electrically conductive leads formed on said first surface and arranged such that said conductive bumps are in electrical contact with the electrically conductive leads.

8. A micro-electronic assembly in accordance with claim 7 wherein said aperture includes a floor at a predetermined depth below the first surface of said substrate and wherein said conductive bumps include a predetermined height such that, when the micro-device is positioned on the substrate, the predetermined height of the bumps cooperates with the depth of the aperture so that said component extends at least partially into said aperture without contacting the floor of the aperture or any other part of the substrate.

9. A micro-electronic assembly in accordance with claim 6 wherein said micro-device is supported on said substrate solely by said electrically conductive bumps.

10. A micro-electronic assembly in accordance with claim 6 wherein said electrically conductive bumps include gold.

11. A micro-electronic assembly in accordance with claim 1 wherein said component is a bridge which forms part of the overall transducer.

12. A micro-electronic assembly in accordance with claim 1 wherein said transducer is a microphone.

13. A micro-electronic assembly in accordance with claim 1 wherein said transducer is a pressure sensor.

14. A method of manufacturing a micro-electronic assembly, said method comprising:
   a) forming a substrate from a substrate material such that said substrate includes an outer surface configuration which defines an aperture within a first surface of the substrate;
   b) forming electrically conductive means on said first surface;
   c) providing a micro-device including a die and a transducer, the die including an active surface supporting a component which forms part of the overall transducer and projects outwardly from said active surface and electrical connecting means on said active surface for electrically interfacing the overall micro-device; and
   d) supporting said micro-device on the first surface of said substrate such that only said component extends at least partially into the aperture and so that said electrical connecting means is electrically engaged with said electrically conductive means.

15. A method according to claim 14 wherein the step of forming said substrate includes the steps of defining a second surface opposing said first surface and forming said aperture as a through-hole extending from the first surface to the second surface.

16. A method according to claim 14 wherein the step of forming said substrate includes the step of forming said aperture including a floor at a predetermined distance below said first surface.

17. A method according to claim 16 wherein said substrate includes a second surface opposing said first surface and wherein said step for forming said substrate includes the step of forming at least one through-hole extending from said floor in said aperture to said second surface.

18. A method according to claim 17 wherein a plurality of said through-holes are formed between said floor and said second surface.

19. A method according to claim 14 wherein said electrical connecting means is formed including a series of bonding pads arranged on said active surface and a series of electrically conductive bumps positioned on respective ones of said bonding pads.

20. A method according to claim 19 wherein the step of forming said electrically conductive means on said substrate includes the step of forming a plurality of electrically conductive leads on said first surface and wherein said step for supporting the micro-device includes the step of electrically connecting each conductive bump with a respective electrically conductive lead.

21. A method according to claim 20 wherein said aperture is defined as including a floor at a predetermined depth below the first surface of said substrate and wherein said conductive bumps are formed having a predetermined height such that, when the micro-device is supported on the substrate by the conductive bumps, the predetermined height of the bumps cooperates with the depth of the aperture so that said component extends at least partially into said aperture without contacting any part of the substrate.

22. A micro-electronic assembly, comprising:
a) a substrate including an outer surface configuration defining an aperture within a first surface thereof and electrically conductive means on said first surface; and
b) a micro-device including an active surface, a bridge which covers part of said active surface side and electrical connecting means positioned on said active surface, said micro-device being positioned on the first surface of said substrate such that only said bridge extends at least partially into the aperture without contacting any part of said substrate, and so that said electrical connecting means is electrically engaged with said electrically conductive means.

23. A micro-electronic assembly in accordance with claim 22 wherein said electrical connecting means includes a series of bonding pads arranged on said active surface and a series of electrically conductive bumps positioned on respective ones of said bonding pads, said micro-device is supported solely by said electrically conductive bumps and only said bridge extends at least partially into the aperture without contacting any part of said substrate, and so that said series of bonding pads is electrically engaged with said electrically conductive means.

24. A micro-electronic assembly in accordance with claim 23 wherein said electrically conductive bumps define a certain space between said active surface of said bridge and said first surface of said substrate.

25. A micro-electronic assembly in accordance with claim 23 wherein said conductive bumps include a predetermined height such that, when the micro-device is positioned on the substrate, the predetermined height of the bumps cooperates with the depth of the aperture so that said bridge extends at least partially into said aperture but does not exceed the depth of said aperture without contacting any part of the substrate, whereby said micro-device is supported on said substrate solely by said electrically conductive bumps.

26. A micro-electronic assembly in accordance with claim 25 wherein said substrate includes a floor at a predetermined depth below the first surface and a second surface opposing said first surface, said substrate further defines a plurality of holes extending from said first floor in said aperture to said second surface.

* * * * *